Figure 1:
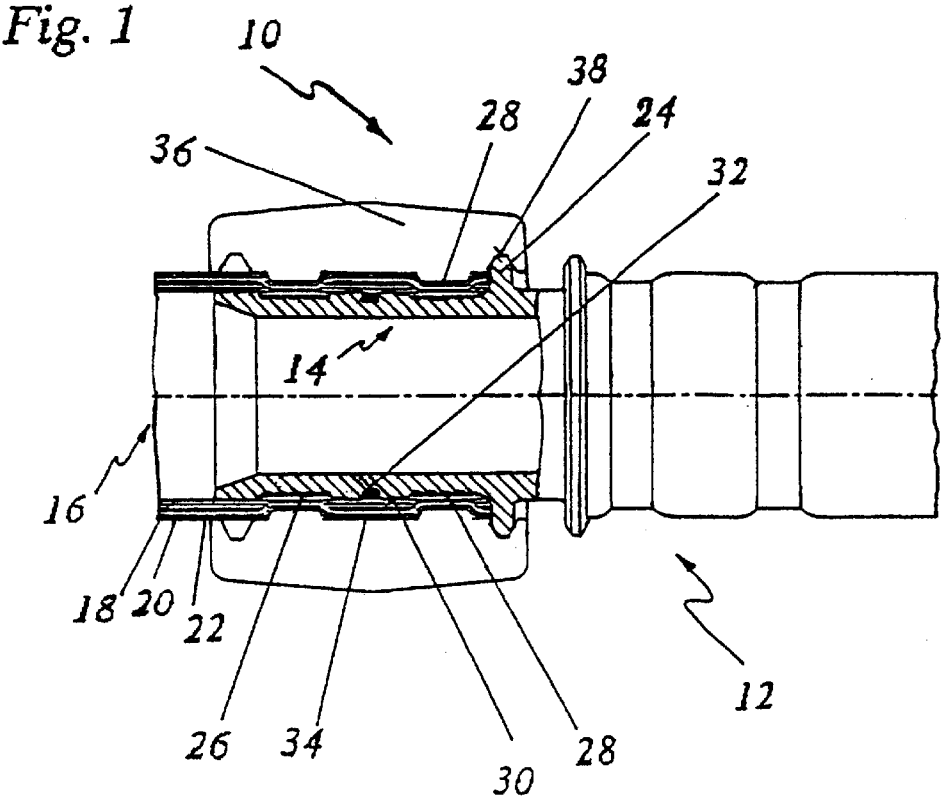

United States Patent [19]
Weber

[11] Patent Number: 6,145,892
[45] Date of Patent: Nov. 14, 2000

[54] PRESS CONNECTOR

[75] Inventor: Peter Weber, Jona, Switzerland

[73] Assignee: Geberit Technik AG, Jona, Switzerland

[21] Appl. No.: 09/155,277

[22] PCT Filed: Feb. 4, 1998

[86] PCT No.: PCT/IB98/00226

§ 371 Date: Sep. 24, 1998

§ 102(e) Date: Sep. 24, 1998

[87] PCT Pub. No.: WO98/38449

PCT Pub. Date: Sep. 3, 1998

[30] Foreign Application Priority Data

Feb. 25, 1997 [DE] Germany ............................. 197 07 827

[51] Int. Cl.[7] .............................. F16L 33/01; F16L 33/18; F16L 33/00
[52] U.S. Cl. .......................... 285/259; 285/256; 285/382
[58] Field of Search .................... 285/256, 382, 285/259, 242, 252, 253

[56] References Cited

U.S. PATENT DOCUMENTS

| | | | |
|---|---|---|---|
| 2,139,745 | 12/1938 | Goodall | 285/259 |
| 3,689,111 | 9/1972 | Osmun et al. | 285/382 |
| 5,044,671 | 9/1991 | Chisnell et al. | 285/256 |
| 5,096,231 | 3/1992 | Chisnell et al. | 285/256 |
| 5,378,023 | 1/1995 | Olbrich | 285/256 |
| 5,388,871 | 2/1995 | Saitoh | 285/247 |
| 5,833,278 | 11/1998 | Riaanda et al. | 285/124.1 |

FOREIGN PATENT DOCUMENTS

| | | | |
|---|---|---|---|
| 685353 | 4/1964 | Canada | 285/256 |
| 0 152 723 | 8/1985 | European Pat. Off. . | |
| 2675880 | 10/1992 | France | 285/256 |
| 3243365 | 5/1984 | Germany | 285/256 |
| 4231623 | 3/1994 | Germany | 285/256 |
| 682 942 A5 | 12/1993 | Switzerland . | |
| 640420 | 7/1950 | United Kingdom . | |
| 762072 | 11/1956 | United Kingdom . | |
| 2177769 | 1/1987 | United Kingdom | 285/256 |

*Primary Examiner*—Eric K. Nicholson
*Attorney, Agent, or Firm*—Cantor Colburn LLP

[57] ABSTRACT

The invention concerns a connector for producing a press connection with at least one pipe, which is pressed tightly against the connector radially by irreversible deformation or by a collar. The invention also concerns a press connection consisting of a connector and connecting pipe. The connector is composed of a basic pipe-shaped body 12, on whose outer periphery there is at least one area 14 against which the pipe 16 is tightly pressed radially. The basic body 12 is made of polyvinylidene fluoride which has a long life and high pressure and temperature resistance.

9 Claims, 1 Drawing Sheet

PRESS CONNECTOR

This invention concerns a connector for a press connection and a press connection produced with it.

Connectors made of plastic to produce a press connection are known, for example from CH 682 942 A5. The connector shown there is made of plastic and has peripheral areas onto which a pipe, especially a connecting pipe, is pressed. With the known connector, there is a rib within the peripheral area, in which a safety ring made of metal is held, which has sharp edges on the outside. This ring guarantees that even at high axial tensile loads, there is a safe, spring-actuated, snap-on connection between the connecting pipe and the connector. Since the basic body of the connector is made of plastic, there are no corrosion problems, which are known with connectors made of brass, for example. Polyolefin and crosslinked polyethylene are given as suitable plastics. This connector works relatively well, but its long-term behavior is not completely satisfactory, especially if there is a very sharp change in temperature. The metal safety ring also makes it expensive to produce.

It is therefore the problem of this invention to create a connector for a press connection and a press connection suitable for high pressure that are inexpensive to produce, that have a long life and that are reliable, even when there are sharp changes in temperature.

This problem is solved by the connector in and the press connection in according to the invention as outlined in the subsequent description, the drawings and the appended claims.

Surprisingly, it has been found that the plastic polyvinylidene fluoride (PVDF), which is described in R. Schneider and Th. Kohler "A Contribution to the Use of Plastic Pipe in Disposal Technology," gwf Wasser. Abwasser 134 (1993) No. 1, pages 25–33 as very suitable for certain special applications, but could not be used in the past for such pipe parts and fittings, because of its very good properties, such as pressure resistance, long-term stability and resistance to temperature changes, is well suited for a press connection, and due to its high surface quality, can also provide sufficient axial safety without an extra metal safety ring.

The connector made of PVDF meets all the hygiene requirements made under the Drinking Water Act. There are no corrosion problems, especially in connection with other metals.

The connecting pipe or pipes are pushed onto the connector, which has several ribs going around it in the peripheral area. There is also a sealing ring that goes around it and serves as an additional seal between the connector and the connecting pipe.

Preferably, the axial safety of the connecting pipe can also be ensured by sawtooth-shaped ribs on the connector. The ribs are then preferably arranged in two axial areas in a uniform orientation, and the orientation in both axial areas can be the same (tension safety alone) or opposite (pressure and safety). However, the sawtooth-shaped ribs with the sharp outer edge are preferably oriented in one direction so that the connecting pipe is secured against tension on the connector. It can be secured against pressure by a radial stop surface. Sealing rings can be found between ribbed areas or on the flange end of the connector.

In addition to ribbing in the peripheral area, there can be a step-shaped design in the peripheral area. The steps provide, first of all, axial safety and, secondly, a better seal. When pressed, they engage the connecting pipe more intensively with the connector.

The invention will be described below using an example of embodiment with a schematic drawing.

Figure 2:
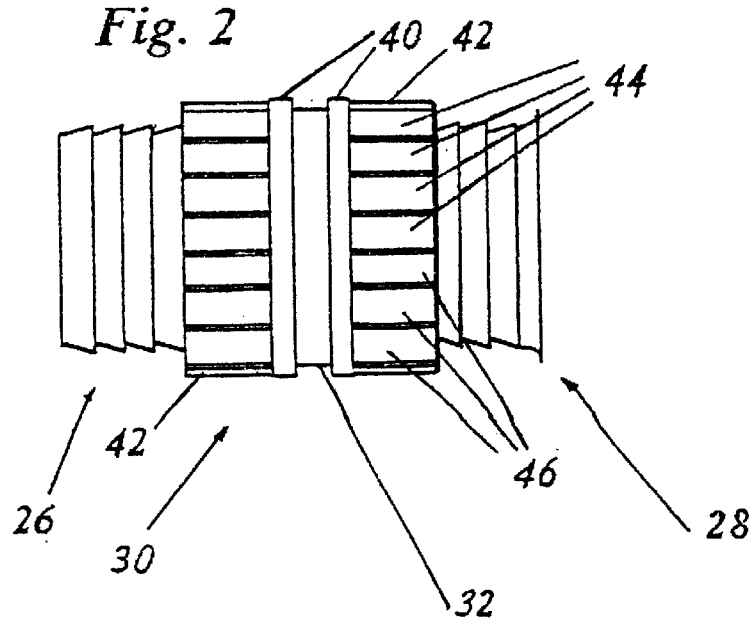

FIG. 1 shows a partially sectioned side view of a press connection with a connector, a connecting pipe and pliers and FIG. 2 shows an enlarged view of the peripheral area of the connector in FIG. 1 intended for pressing the connecting pipe.

FIG. 1 shows a press connector 10 with a pipe-shaped connector 12, which has a peripheral area 14 which is intended for pressing a connecting pipe 16 on at least one free end. The connecting pipe 16 is generally made of an inner layer 18 of crosslinked polyethylene, an intermediate layer 20 of aluminum and an outer layer 22 of polyethylene. This connecting pipe 16 is pushed onto the free end of the connector 12, until the front of it hits a projection 24 on the connector that goes around it. The peripheral area 14 of the connector 12, provided for pressing with the connecting pipe, contains two ribbed areas 26, 28 with a smaller diameter that are separated from one another by a raised area 30. The peripheral area 14 will be described later on in more detail in connection with FIG. 2. In the raised area 30 whose diameter is somewhat larger, there is a groove 32 for an O-ring seal 34. The connecting pipe is pressed onto the connector 12 with pliers 36. One property of the connector 12 is that it is irreversibly deformed after pressing. Therefore the pliers have profiled areas that correspond to the profiled areas in the peripheral area 14 of the connector 12 that has been provided for pressing on the connecting pipe 16. The pliers 36 also have a groove 38 that works with the projection 24 on the connector like a snap to achieve a more precise axial seat of the pliers 36 on the outer periphery 14 of the connector 12. During pressing, the ribs running in the direction of the periphery intersect in areas 26, 28 in the inner layer 18 of the connecting pipe 16 and in this way provide a seal and also axial safety. An additional seal and axial safety are provided by the different diameter of ribbed areas 26 and 28 on one hand and raised area 30 on the other hand. The connector 12 made of polyvinylidene fluoride is very surface-true, resistant to changes in temperature and pressure and has a very long life, and provides a long-term stable press connection between the connector 12 and the connecting pipe 16. The irreversible deformation of the connecting pipe 14 is brought about primarily by the intermediate layer made of aluminum.

FIG. 2 shows a detailed view of the peripheral area 14 with the two ribbed axial sections 26, 28 and the raised area 30 in between.

The raised area 30 contains the groove 32 for the sealing ring 34 and, on both sides of the groove 32, a raised flat round area 40, to which an axial area 42 is attached on the outside, which has a number of first and second sawtooth ribs 44 and 46 over the periphery. The first sawtooth ribs 44 are oriented in one direction, and the second ribs 46 are oriented opposite the first ribs 44. These radially arranged ribs, which extend only over a small peripheral angle, provide rotational safety for the connecting pipe, and the opposite orientation of the two ribs 44 and 46 provide rotational safety in both directions of rotation.

What is claimed is:

1. A connector for producing a press connection with at least one pipe, said connector comprising:
   a pipe-shaped body having an outer periphery with at least one peripheral area including a pair of ribbed sections having sharp top edges, wherein said peripheral area is adapted to be tightly pressed radially against said pipe when said connector is secured to said pipe;

an O-ring axially secured to and projecting radially outward from said body, wherein said O-ring comprises an elastic material;

first and second axial ribs for providing rotational safety in both directions of rotation of said pipe on said connector; and wherein said body comprises polyvinylidene fluoride.

2. The connector of claim 1, wherein said ribs are shaped like saw teeth.

3. The connector of claim 1, wherein said O-ring is disposed in a receiving groove in the peripheral area between said ribbed sections, said peripheral area for pressing against said pipe when said connector is secured to said pipe.

4. The connector of claim 1, wherein said receiving groove is disposed in a raised section between said ribbed sections, said raised section has a diameter greater than the diameter of said peripheral area and said raised section presses against said pipe when said pipe and said connector are radially pressed together.

5. The connector of claim 4, wherein the raised section of the peripheral area includes said first and second axial ribs for providing rotational safety in both directions of rotation of said pipe on said connector.

6. The connector of claim 5, wherein said first and second ribs are shaped like saw teeth and are aligned opposite on both sides of said receiving groove.

7. The connector of claim 1, further comprising:

a projection disposed around said connector, said projection forming an axial stop for said pipe.

8. The connector of claim 1, wherein said pipe is pressed tight against said connector by an irreversible deformation of a press collar radially against said connector.

9. A press connection including the connector of claim 1 having at least one pipe connected thereto, said press connection comprising:

an inner layer of crosslinked polyethylene;

an intermediate layer of aluminum, and an outer layer of polyethylene.

\* \* \* \* \*